United States Patent [19]

Kircher et al.

[11] Patent Number: 4,838,622

[45] Date of Patent: Jun. 13, 1989

[54] BRAKE SYSTEM WITH ANTI-LOCK CONTROL AND/OR TRACTION SLIP CONTROL AS WELL AS BRAKING PRESSURE MODULATOR FOR SUCH A BRAKE SYSTEM

[75] Inventors: Dieter Kircher, Frankfurt am Main; Hubertus von Gruenberg, Bad Homburg; Klaus-Dieter Blum, Kelkheim, all of Fed. Rep. of Germany

[73] Assignee: Alfred Teves GmbH, Frankfurt am Main, Fed. Rep. of Germany

[21] Appl. No.: 194,790

[22] Filed: May 17, 1988

[30] Foreign Application Priority Data

May 22, 1987 [DE] Fed. Rep. of Germany ....... 3717238
May 22, 1987 [DE] Fed. Rep. of Germany ....... 3717237
May 22, 1987 [DE] Fed. Rep. of Germany ....... 3717236

[51] Int. Cl.[4] .......................... B60T 8/42; B60T 13/68; F16H 3/44
[52] U.S. Cl. ...................................... 303/115; 303/61; 303/119; 74/785
[58] Field of Search ............... 74/750 R, 785; 310/80, 310/83; 188/170, 181 A, 181 R; 303/20, 61, 68, 113, 114, 115, 119; 180/197

[56] References Cited

U.S. PATENT DOCUMENTS 3,549,210 12/1970 Birge et al. ........................... 303/115
3,588,190 6/1971 Nakano ................................. 303/115
3,905,653 9/1975 Muller et al. .
4,100,973 7/1976 Freudenthal .................... 188/170 X
4,546,295 10/1985 Wickham et al. ...................... 310/83
4,691,813 8/1986 Dittner et al. ................... 303/115 X
4,702,531 10/1987 Kircher et al. ...................... 303/114
4,750,124 6/1988 Lin et al. ............................. 303/100

FOREIGN PATENT DOCUMENTS 0252789 1/1988 European Pat. Off. ............ 303/115
1916662 8/1970 Fed. Rep. of Germany .
2824482 12/1979 Fed. Rep. of Germany .
3317629 11/1984 Fed. Rep. of Germany .
3322422 1/1985 Fed. Rep. of Germany ...... 303/115
3437994 4/1986 Fed. Rep. of Germany .
3602430 7/1987 Fed. Rep. of Germany .

Primary Examiner—Andres Kashnikow
Assistant Examiner—Timothy Newholm
Attorney, Agent, or Firm—James B. Raden

[57] ABSTRACT

A brake system with anti-lock control and/or traction slip control is disclosed including a hydraulic braking pressure generator, a central plunger system, separating valves between the braking pressure generator and the plunger system as well as wheel valves. Further, there is provided an electronic controller which serves to modulate during a control action the braking pressure in the wheel brakes by actuation of the central plunger system and the wheel valves according to the so-termed Multiplex method. The system includes a braking pressure modulator substantially composed of the plunger system, an electric drive motor which is coupled to the plunger system by a single or double unit of planets and a worm drive.

5 Claims, 3 Drawing Sheets

4,838,622

BRAKE SYSTEM WITH ANTI-LOCK CONTROL AND/OR TRACTION SLIP CONTROL AS WELL AS BRAKING PRESSURE MODULATOR FOR SUCH A BRAKE SYSTEM

BACKGROUND OF THE INVENTION

The present invention relates to a brake system of the type having anti-lock control including a pedal-operated hydraulic braking pressure generator, a braking pressure modulator which is provided in the pressure fluid conduits between the braking pressure generator and the wheel brakes and which serves to vary the braking pressure by changing the volume of a chamber containing the hydraulic medium, sensors for determining the wheel rotational behavior and electronic curcuits for processing the sensor signals and for generating braking-pressure control signals. The invention also relates to brake systems which include both anti-lock control and traction slip control and to such brake system including braking pressure modulators for controlled vehicular braking.

Brake systems of this type which operate according to a principle known as the plunger principle are known. In such systems, as soon as the wheel rotational behavior displays a tendency to lock, the pressure fluid conduit from the braking pressure generator to the wheel brake affected will be closed and the volume of a chamber connected with the affected wheel brake and containing the enclosed hydraulic medium will be expanded by the action of an auxiliary force. For this purpose it is conventional practice to use a piston or plunger piston whose end surface confines a chamber hydraulically communicating with the wheel brake, and which is displaceable by the braking-pressure control signals with the aid of an extraneous force or auxiliary force. To re-increase the braking pressure during a control action, the piston is reset into its original position.

Such a brake system is described for instance in the German published patent application No. P 34 37 994. The braking pressure generator of that system includes a master brake cylinder to which the wheel brake of the controlled wheel is hydraulically connected. Inserted into the pressure fluid conduit for achieving pressure modulation is an adjusting element comprising a plunger piston and a spherical seat valve which valve, in the adjusting element's inactive position, is kept open by a tappet fastened to the end surface of the piston. A strong spring maintains the piston in its initial position in which position the adjusting element does not influence the braking operation. To displace the piston in opposition to the force of this spring, so as to achieve the desired pressure decrease during a control action, the piston is connected with an electric motor by way of a male screw and an eddy-current clutch. The clutch is essentially composed of a cogwheel driven by the electric motor, a stationary induction coil and a rotor which is connected to the male screw and with the plunger piston. The torque exerted on the rotor, which causes retraction of the plunger piston and thereby results in the volume increase and corresponding reduction in braking pressure, is dependent on the magnitude of the induction current in the induction coil which, when the cogwheel is rotating, generates a rotating field. Resetting of the piston is effected by the resetting spring. Variation of the induction current which flows through the induction coil provides for control of the braking pressure variation.

As soon as the plunger piston is displaced in opposition to the force of the resetting spring as a result of the torque generated, the spherical seat valve will close and thereby interrupt the pressure fluid conduit leading from the braking pressure generator to the pressure modulator and to the wheel brake.

Further, the anti-lock hydraulic brake system disclosed in German published patent application No. P 36 02 430 has each brake circuit furnished with a plunger system having a stepped piston that is applied by the braking pressure and which is kept in its initial position by a resetting spring in the event of braking operations without slip control. The auxiliary energy for displacing the plunger piston, which must overcome the force of the resetting spring, is supplied by a hydraulic pump which includes a pressure fluid conduit for each plunger system. One shortcoming of such brake systems is that two or more plunger systems are required which increases complexity of the system.

Another known brake system is disclosed in the German published patent application No. P 33 17 629 which includes a master cylinder and a vacuum or hydraulic booster inserted upstream of the master cylinder for boosting the pedal force and is designed such that, in a slip control action, the auxiliary-force-assisted pedal force directed to the master cylinder is temporarily partially or fully compensated by an opposing extraneous force. The controlled wheels are connected to the master cylinder by way of multidirectional control valves which are normally open and which can be switched over to close. According to the so-called Multiplex method, the individual wheels are consecutively connected to the master cylinder by means of these multidirectional valves. By corresponding adjustment and variation of the opposing extraneous force, the braking pressure in the wheel which is at any time in hydraulic communication with the master cylinder can be decreased or increased to the pressure level desired. The generation and quick variation of the extraneous force which counteracts the pedal force in such systems necessitates an elaborate braking pressure generator design. Further these known brake systems are not adapted for traction slip control.

SUMMARY OF THE INVENTION

It is an object of the present invention to provide for an anti-lock brake system which can be manufactured cost effectively and which includes a slip control system which has improved control and provides greater safety of operation. Another object of the invention is to provide for a brake system which is suitable both for anti-lock control and for traction slip control. A further object of this invention to provide for a particularly straightforward all-round braking pressure modulator for slip-controlled vehicular brake systems which is also cost effective to manufacture and which has comparatively short response times and accurate controllability.

These objects are achieved according to the invention wherein a braking pressure modulator includes a central plunger system which is connected with the braking pressure generator by way of separating valves which are open in their initial position and which can be switched to close, and to the wheel brakes of the controlled wheels by way of wheel valves controllable independently of one another according to the invention during control action, the braking pressure in the wheel brakes of the individually controlled wheels is adapted to be modulated consecutively by actuating the central plunger system and the wheel valves according to the so-termed Multi-plex method.

Anti-lock and traction slip control is provided for since the central plunger system comprises at least one piston guided in a cylinder and coupled with an electric drive which is reversible in its direction of rotation by a non-self locking worm drive wherein the piston is axially displaceable by actuation of the drive.

A braking pressure modulator which is adapted for use in brake systems of this type includes a clutch-and-gear assembly having a planetary gear with a controllable stopping or braking system.

Advantageously, the inventive brake system requires only one single central plunger system for anti-lock control if the Multiplex method is employed in the individually controlled wheels or wheel groups for adjusting the braking pressure individually controlled wheels or wheel groups for adjusting the braking pressure individually to the respectively optimal value. Since separating valves which are adapted to switch over to close, such as electromagnetically switchable two-way/two-position directional control valves, are used for the purpose of interrupting the pressure fluid connection to the braking pressure generator during the anti-lock control, the interruption of the pressure fluid connection can be brought about instantaneously and irrespective of the instantaneous position of the plunger pistons. This is vital for achieving the control accuracy and the control speed which have to meet higher requirements because of the Multiplex operation.

According to an advantageous embodiment of this invention, the central plunger system comprises a plunger piston which is sealedly guided in a cylinder and which is axially displaceable in opposition to the force of a resetting spring by means of an electric drive motor that is coupled to the plunger piston by a clutch-and-gear assembly and a non self-locking worm drive. In this case, a motor having only one direction of rotation is sufficient because the spring takes care of the resetting. The clutch-and-gear assembly as well as the worm drive can also be achieved with a simple, non-complex design.

The planetary gear does not function only as a clutch, but functions also as a gear for the reduction of the number of revolutions of the electric drive motor, and may have for instance a reduction ratio of 1:3 up to 1:10.

According to another favorable embodiment of this invention, the braking pressure generator and the plunger system are designed as tandem arrangements in a manner known and are adapted for connection to two hydraulically isolated brake circuits.

According to another embodiment of the anti-lock brake system of this invention, the plunger system comprises one or more plunger pistons which are displaceable both in direction for reducing the braking pressure and to achieve a braking pressure increase by means of a reversible electric drive including a worm drive.

According to one embodiment, the re-increase of braking pressure subsequent to a braking pressure reduction in the course of a control action can be varied, on the one hand. For example, either a rapid or a retarded braking pressure re-increase is possible. On the other hand, the plunger-piston resetting spring can be designed as a mere emergency spring and thus be made relatively weak, because the braking pressure increase or re-increase is assisted by the reversal of the output member's direction of rotation.

Provided that a low-cost and reliable electric motor is available, the plunger system can be equipped with a reversible electric drive motor. On the other hand, however, it is likewise possible to provide the plunger system with a unidirectional electric motor connected with the plunger piston(s) by a clutch-and-gear and worm drive assembly which is adapted to reverse the direction of rotation of an output shaft.

Inventively, anti-lock and traction slip control may also be attained with the aid of an adjusting element designed according to the plunger principle, and a reversible electric drive used in conjunction with a worm drive to generate the necessary displacement forces and to control the movement of the plunger piston. The piston in such system is displaceable from a mid-position into both axial directions so that the plunger is able to accomplish braking pressure reduction, braking pressure increase or braking pressure generation and/or a braking pressure amplification.

According to an important embodiment of such a brake system for anti-lock and traction slip control, the reversible drive includes an electric motor having a constant direction of rotation in conjunction with a clutch-and-gear assembly whose output member's direction of rotation is reversible. In another switch position of the clutch-and-gear assembly, the electric motor and worm drive are decoupled.

It is an advantage in many cases if the coupling between the motor and the worm drive disengages upon power failure, thereby enabling the adjusting piston to immediately re-assume its inactive position or mid-position defined by the springs on either side, in which position the adjusting element does not influence the braking operations.

In a braking pressure modulator according to this invention, the clutch-and-gear assembly comprises a planetary gear with a controllable stopping or braking system. The planetary gears can be made fully or at least mainly of plastics which advantageously makes them comparatively inexpensive. Accordingly, in the case of application provided herein, high-precision toothed wheels are not required.

Also, these gears provide for a high rotational speed reduction or torque conversion, and accordingly a relatively simple and inexpensive drive motor is sufficient for generating the required adjusting forces In an important embodiment of this invention, a drive motor having a fixed direction of rotation is utilized, and the adjusting element is reset either by spring force into its initial position, or by reversal of the output-shaft direction of rotation with the aid of a double planetary gear unit.

Another advantage of using planetary gear unit is that the coupling between drive motor and adjusting piston and/or the reversal of the direction of rotation—when a double planetary gear unit is used—is attainable by means of mechanically simple component parts which lend themselves to being manufactured with little effort. The forces required to be generated for the coupling or for the reversal are also low.

The pressure fluid conduit between the working chamber of the braking pressure modulator or, respectively, the plunger and the braking pressure generator of the connected brake system is closed during control action by an electromagnetically actuatable multidirectional control valve because this valve, in contrast to a- known, mechanically operated spherical seat valve which is merely opened in the end positon of the adjusting piston, may be switched over to close or switched back at the appropriate point of time irrespective of the instantaneous position of the piston. In one embodiment, the planetary gear is composed of a single unit of planets which, in turn, includes a sun wheel, one or move planet pinions and an internal geared wheel.

According to the present invention, an electromagnetically operable friction brake which is released in the inactive position is used as a stopping or braking system which brakes the component parts of the planetary gear. For example, the friction brake may act on the internal geared wheel of the planetary gear.

After actuation of the stopping or braking system, the torque of the drive motor causes displacement of the adjusting piston in opposition to the force of a resetting spring and thereby causes an increase in the volume of the working chamber.

According to another favorable embodiment of this invention, the planetary gear is provided with a double unit of planets and is designed such that actuation of the stopping or braking system enables reverses the direction of rotation of the output shaft, while the direction of rotation of the drive motor remains the same. In a braking pressure modulator according to this invention, the planet carriers of both units of planets are coupled to each other and are coupled by the worm drive with the adjusting piston. The drive motor is connected to a sun wheel belonging to a unit of planets whose internal geared wheel is coupled to the sun wheel of the second unit of planets. By alternatively braking the first or the second internal geared wheel, while the direction of rotation of the drive motor remains the same, the direction of rotation of the output shaft may be alternatively reversed.

According to still another embodiment of this invention, the adjusting piston is displaceable in opposition to the force of a resetting spring in one switch position of the stopping or braking system. The stopping or braking system is designed such that the adjusting element is adapted to be reset by the spring force in an addtional switch position. Advantageously, the planetary gear reduces the numbers of revolutions of the electric drive motor approximately in the ratio of 1:3 up to 1:10.

BRIEF DESCRIPTION OF THE DRAWING

Further features and advantages of the invention will be appreciated from the following Detailed Description of the Preferred Embodiment and the accompanying drawings in which.

DETAILED DESCRIPTION OF A PREFERRED EMBODIMENT

Figure 1:
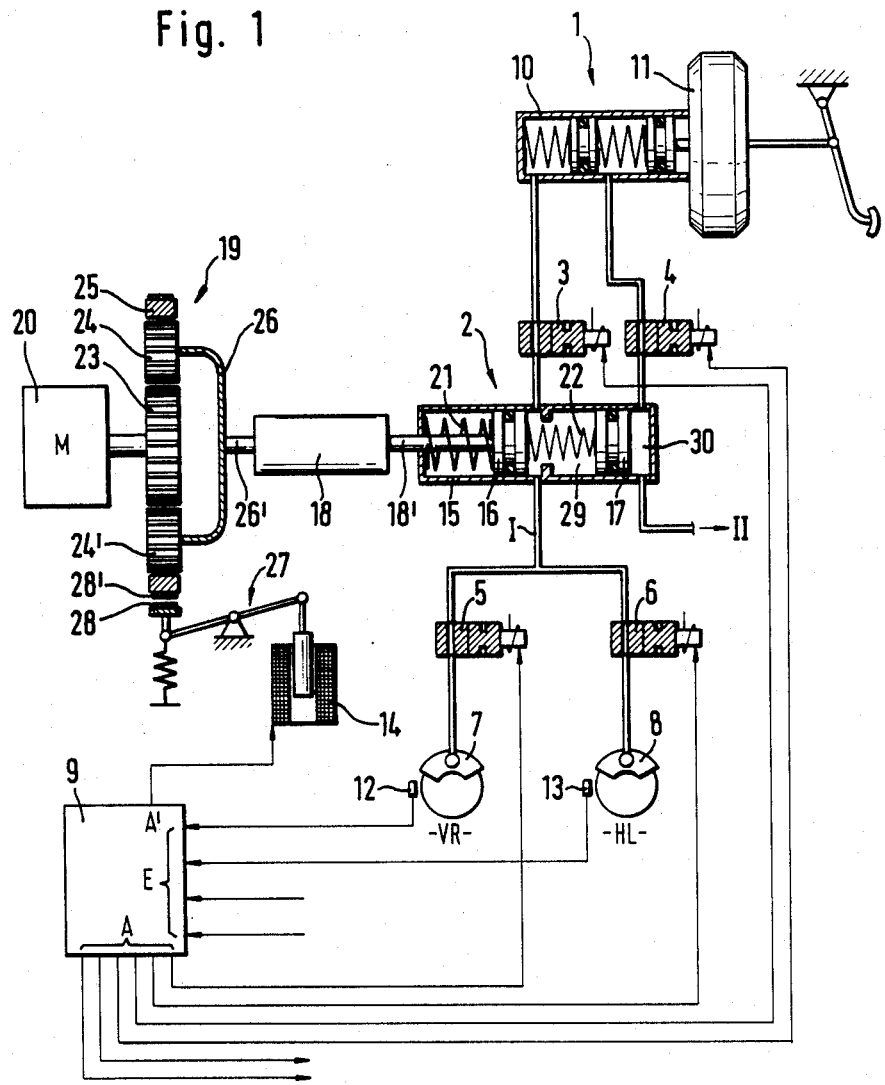
FIG. 1 is a schematic representation of a hydraulic and electric circuit of the most important component parts of a brake system having anti-lock control according to the invention.

The brake system illustrated in FIG. 1 is substantially composed of a pedal-operated braking pressure generator 1, a central plunger system 2, separating valves 3, 4 for interrupting the pressure fluid conduit from the braking pressure generator 1 to the plunger system 2, of wheel valves 5, 6 in the pressure-fluid connection to the wheel brakes 7, 8 of the controlled wheels VR, HL, and a electronic controller 9. The illustrated embodiment is a dual-circuit brake system with diagonal brake-circuit allotment. A brake circuit I leads to the right front wheel VR and the left rear wheel HL, the brake circuit II leads to the other two wheels which are not illustrated.

The braking pressure generator comprises a tandem master cylinder 10 with a booster 11 provided upstream thereof. Like the wheel valves 5, 6, the separating valves 3, 4 are designed as electromagnetically actuatable two-way/two position directional control valves which are open in their inactive position, that is to permit fluid flow, and which will assume their closed position after they are excited. The controller 9 includes the electronic circuits for processing the sensor signals supplied by inductive transducers 12, 13, and for generating braking-pressure control signals which are delivered by way of the outputs A to the single valves 3, 4, 5, 6. Another output A' of the controller 9 leads to an electromagnetic actuating device 14 which controls the drive of the plunger system 2.

In the illustrated embodiment, the central plunger system 2 comprises a cylinder 15 in which two plunger pistons 16, 17 are axially slidably and sealedly guided. Displacement to the left, which brings about volume expansion and thereby braking pressure reduction, is caused by a worm drive 18 which is coupled to an electric drive motor 20 by a clutch, or more precisely a clutch-and-gear assembly 19. In their inactive position shown, the plunger pistons 16, 17, are held by a spring 21 as long as anti-lock control has not yet responded, which spring, in conjunction with a weak spring 22, resets the pistons after the drive motor 20 is uncoupled.

The clutch-and-gear assembly 19 is comprised of a unit of planets which includes a sun wheel 23 coupled to the drive motor 20, several, for example three, planet pinions 24, 24' and an internal geared wheel 25. The planet pinions 24, 24' are arranged rotatably on a planet carrier 26 which, in turn, is seated on a planet carrier shaft 26' which serves as an output shaft. In the worm drive 18, the rotation of the shaft 26' is transformed into an axial displacement which by way of a piston rod 18', causes axial displacement of the plunger pistons 16, 17.

Transmission of torque from the motor 20 onto the worm drive 18 is possible in the illustrated unit of planets only after the internal geared wheel 25 is stopped. To this end, there is provided a stopping or braking system 27 which includes friction linings 28, 28' which start to function as soon as the electromagnet 14 is switched on to cause the friction linings 28, 28' move into engagement.

The brake system illustrated in FIG. 1 operates as follows:

As long as anti-lock control does not respond, all multidirectional control valves 3, 4, 5, 6 remain in their inactive position in which the pressure fluid conduit through the valves is open. The stopping or braking system 27 stays in its released condition, too, so that the motor 20 and the worm drive 18 and thus the plunger system 2 are uncoupled. The resetting spring 21 retains the plunger piston 16 in the inactive position shown. The piston 17 is acted upon equal pressure on either of its sides.

Anti-lock control will begin upon the occurrence of a tendency to lock at any one of the vehicle wheels what becomes noticeable by comparing and logically combining the signals obtained by the individual wheel sensors 12, 13. As noted, the signals are processed in the controller 9.

The braking-pressure control signals at the outputs A, A' of the controller 9 cause the electromagnet 14 to switch on and accordingly the internal geared wheel 25 of the clutch-and-gear assembly 19 is stopped or braked. Change-over of the separating valves 3, 4, causes interruption of the pressure fluid conduit from the braking pressure generator 1 to the plunger system 2. The wheel valves 5, 6 of the brake circuit I and the corresponding valves in the brake circuit II, which valves are of like design as valves 5 and 6 and therefore are not shown, are also switched over to close, with the exception of that wheel valve which leads to the wheel indicative of the tendency to lock.

Due to the braking of the internal geared wheel 25, a torque is transmitted from the motor 20 by way of the sun wheel 23, the planet pinions 24, 24', the planet carrier 26 and the shaft 26' onto the worm drive 18. Ensuing therefrom is the displacement of the plunger pistons 16, 17 to the left in opposition to the force of the spring 21. As a consequence, the resultant volume expansion in the chambers 29 and 30 of the plunger system 2 causes a braking pressure reduction in that wheel brake which is connected thereto at that point of time by the opened wheel valve. In the other wheel brakes, the braking pressure remains constant since the associated valves were changed over to close.

As soon as the braking pressure at the wheel which had become unstable or had been imminently locking has decreased to the desired level as predefined by the controller 9, the pressure fluid will be trapped by change-over of the assigned wheel valve so that pressure build-up can be continued or the pressure can be adjusted to a different, higher or lower, value in the other wheel brakes in a corresponding manner according to the Multi-plex method. To continue the pressure reduction or to re-increase the pressure, the electromagnet 14 is switched off and release of the friction linings 28, 28' frees the internal geared wheel 25 which co-rotates and thereby precludes transmission of torque by the assembly 19. Moreover, this 'freewheeling' allows the plunger pistons 16, 17 and the worm gear 18 to reset by the force of the spring 21.

Figure 2:
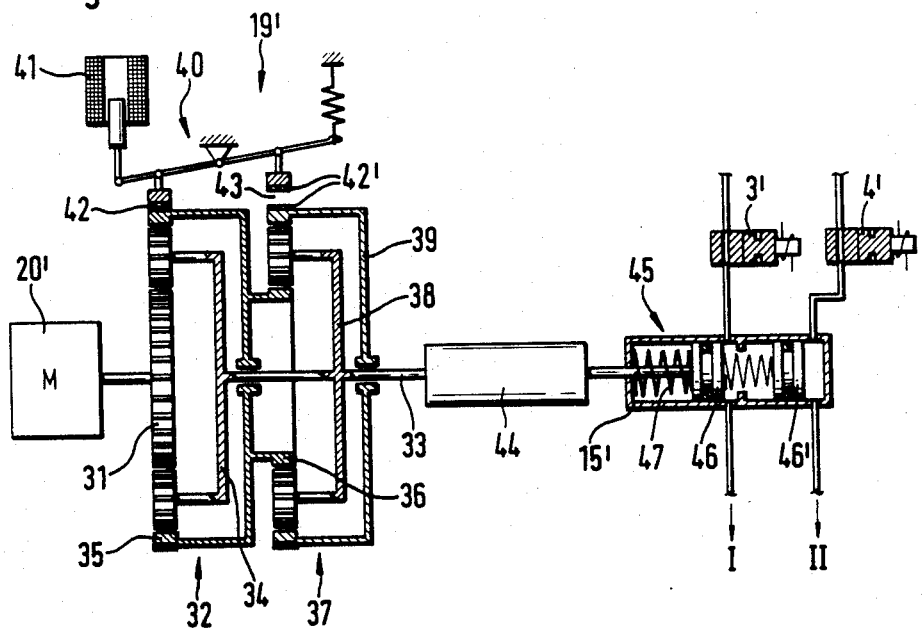
FIG. 2 is a schematic representation of a clutch-and-gear assembly for use in the brake system according to FIG. 1.

In the embodiment displayed in FIG. 2, the clutch-and-gear assembly 19' is composed of a double unit of planets.

As in the embodiment shown in FIG. 1, the drive motor 20' is coupled by its shaft with the sun wheel 31 of a unit of planets 32, while the output shaft 33 of this gear assembly 19' is connected to the planet carrier 34 of the unit of planets 32. The internal geared wheel 35 of the unit of planets 32 is coupled with the sun wheel 36 of a second unit of planets 37 whose planet carrier 38 is by way of the shaft 33 directly coupled with the planet carrier 34 of the first unit of planets 32. The internal geared wheel of the second unit of planets which rotates on the shaft 33 and is referred to by reference numeral 39. By means of an electromagnetically actuatable stopping or braking system 40, either the first or the second internal geared wheel is stopped or braked. Therefore, switch-over of the stopping or braking system 40 causes a reversal of the direction of rotation of the output shaft 33, with the direction of rotation of electric motor 20' remaining unchanged.

In the illustrated inactive position, that is when the electromagnet 41 is not yet switched on, the internal geared wheel 35 of the first unit of planets will be stopped by engagement of the friction linings 42 indicated in the drawing, while the braking mechanism 43 with the friction lingings 42' for the second internal geared wheel 39 is released. Upon excitation of the electromagnet 41, the first internal geared wheel is released, whereas the second internal geared wheel is fixed.

Rotation of the output shaft 33 by the worm drive 44 causes an axial displacement of the pistons in the interior of the cylinder 15' of the plunger system 45. Although the drive motor 20' is an electric motor with a predetermined direction of rotation, the torque of the motor can be used for displacing the pistons 46, 46' of the plunger system 45 in both directions—depending on the switch position of the stopping or braking system 40—so that the speed and the duration of both the braking pressure and reduction and the braking pressure increase can be varied by controlling the motor 20' and the system 40. The spring 47 in the interior of the plunger system 45 assists in resetting the pistons 46, 46' into their inactive position, which they assume during normal braking operations, and serves as a so-called emergency spring for maintaining the braking function upon power failure as well as upon the occurrence of specific defects in the modulator system.

The separating valves 3', 4' at the inlet of the plunger system 45 and the non-illustrated component parts of the brake system according to the brake system shown in to FIG. 2 are in principle identical with those of the system according to FIG. 1. However, the special features of the controllable double unit of planets 40 have to be taken into account when programming the controller, provided that microcomputers are used, or when designing the electronic circuits to process the sensor signals and to generate the control signals.

If no freewheeling position of the stopping or braking system 40 is provided, the electric motor 20' will be switched on and off with each control command to displace the plunger pistons 46, 46'. However, it is also possible to have the resetting force of the spring 47 which is in the interior of the plunger system 45 included in the control and to have the resetting assisted by the torque of the motor 20' only during specific control periods. Due to the ability to reverse the direction of rotation with the aid of the double unit of planets 40, by including a freewheeling position of the braking system 40, a great number of control variations can be achieved in a very simple manner depending on the application and the requirements.

Figure 3:
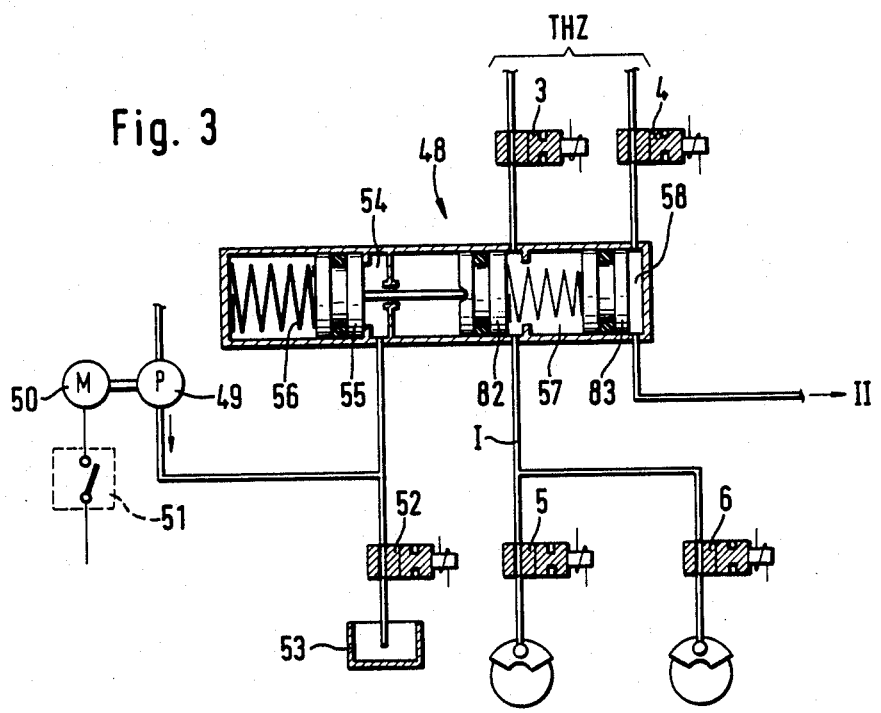
FIG. 3 is a schematic representation of a plunger system with hydraulic control according to an alternative embodiment of the invention.

FIG. 3 illustrates another embodiment of the invention, wherein the energy for the displacement of plunger pistons 82, 83 in the interior of a plunger system 48 is generated by an electromotively driven hydraulic pump 49. After the drive motor 50 of the pump 49 has been switched on by means of the symbolically illustrated electric switch 51, the auxiliary pressure of the pump 49 can be governed most simply by an electromagnetically switchable hydraulic two-way/two-position directional control valve 52. Auxiliary pressure will not develop until the pressure fluid conduit to an outlet and return reservoir 53 is interrupted by change-over of the valve 52. Auxiliary-pressure supply systems of this type are known and, therefore, do not require any further description. The auxiliary pressure generated with the pump 49 is introduced into a working chamber 54 in the interior of the plunger system 48 for the purpose of braking pressure control. By virtue of this auxiliary pressure, a control piston 55 is displaced against the force of a resetting spring 56 in such a fashion that the volume is expanded in the chambers 57, 58, which correspond to the chambers 29, 30 of the plunger system 2 of FIG. 1, and the braking pressure is accordingly decreased. After the reduction of the braking pressure and the switching back of the valve 52 into its illustrated inactive position, the spring 56 will return the control piston 55 and thus also the plunger pistons 46, 46', causing re-increase of the braking pressure during a control action. Since there are no principal differences from the brake systems according to FIGS. 1 and 2, for this description the same reference numerals in FIG. 1 represent the separating valves 3, 4, the wheel valves 5, 6 and the brake circuits I, II.

Figure 4:
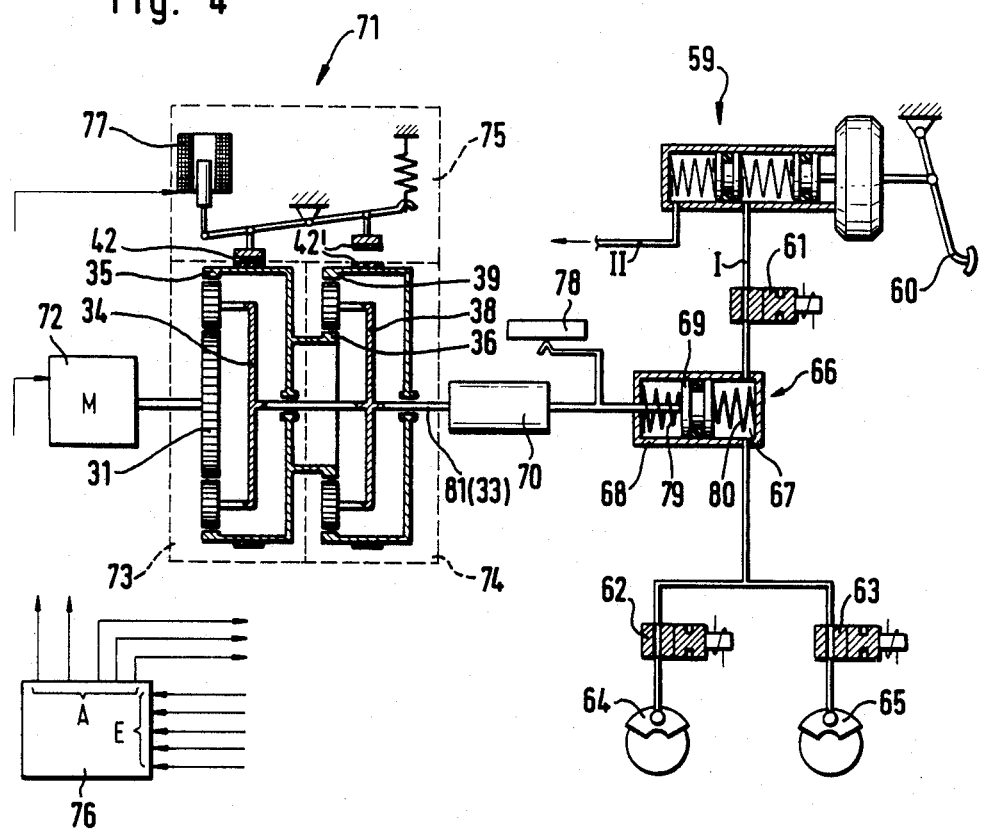
FIG. 4 is a schematic representation of a brake system with anti-lock control and traction slip control according to the invention.

FIG. 4 discloses a brake system with anti-lock and traction slip control. Again, a dual-circuit hydraulic braking pressure generator 59 is operated by a brake pedal 60. Connected to the two brake circuits I, II by way of electromagnetically actuatable multidirectional control valves 61, 62, 63 are the wheel brakes 64, 65 of the controlled vehicle wheels. Since both brake circuits I, II are of like design, only the component parts connected to brake circuit I have been illustrated.

For anti-lock and traction slip control, according to FIG. 4, the pressure fluid conduit leading from the braking pressure generator 59 to the wheel brakes 64, 65 incorporates a plunger system 66 with a working chamber 67, which is confined by the end surface of a plunger piston 69 that is sealedly guided in a cylinder 68, and whose volume is variable by displacement of the piston 69. Valve 61 provided in the pressure fluid conduit interconnecting the braking pressure generator 59 and the working chamber 67 is the separating valve. During the control phases, it prevents pressure fluid flow from the braking pressure generator 59 to the chamber 67 and/or from the chamber 8 to the braking pressure generator. The wheel valves 62, 63 which are provided in the pressure fluid conduit leading from the chamber 67 to the wheel brakes 64, 65 serves to control the individual braking pressure for each wheel during the control actions.

The piston 69 normally assumes a mid-position in the cylinder 68, that is when the brake is not applied and during braking operations without slip control. Therefore, the volume of the working chamber 67 can either be increased or decreased by displacement of this piston—depending on the direction of displacement. Namely, when anti-lock control commences, first a volume increase is required, while traction slip control initially necessitates a volume decrease.

For displacement of the piston 69 and thus to provide for anti-lock and traction slip control, an arrangement is made use of which substantially consists of a worm drive 70, a planetary gear 71, an electric motor 72 incuding a double unit of planets 73, 74 having an electrically controllable stopping or braking system 75. A similar system for axially displacing the piston(s) of the plunger system 66 or 45 has been described already by way of FIG. 2. Therefore, the same reference numerals in FIG. 2 have been chosen for the sun wheels 31, 36, the planet carriers 34, 38, the internal geared wheels 35, 36 and for the friction linings 42, 42' in this description.

Also shown in FIG. 4 is an electronic controller 76 which, by way of inputs E in a way not referred to herein in more detail, is supplied with information about the rotational behavior of the individual vehicle wheels and thus whether their operation is stable about to lock or about to spin. Provided at the controller's outputs A are the control commands for the separating valves, the wheel valves 61, 62, 63, a switch-over electromagnet 77 of the planetary gear 71 and for the drive motor 72. Moreover, the instantaneous position of the piston 69 can be measured by a symbolically shown travel indicator 78 which can be fed into the controller 76. The travel indicator is used with a potentiometer or, in digital electronic systems with a revolution counter.

The brake system according to FIG. 4 operates as follows:

During normal braking operations with the vehicle wheels not tending to lock, the separating valve 61 and the wheel valves 62, 63 remain in their open condition. The piston 69 is retained in the depicted mid-position by strong springs 79, 80 and/or by fixing of the gear 71 and the drive motor 72 and, thereby, does not permit any change in the volume of the working chamber 67.

When a tendency to lock occurs at any one of the vehicle wheels during the braking operation, anti-lock control will commence. First, further pressure fluid supply is interrupted by switching the valve 61 over into its closed position. The motor 72 is switched on, and one of the two internal geared wheels, such as the internal geared wheel 35, is fixed by the stopping or braking device 75. As a result, the piston 69 is displaced to the left in opposition to the force of the spring 79, causing an increase in the volume of the working chamber 67 and thus a reduction of pressure in the wheel brake of the connected wheel, that is the imminently locking wheel. By temporarily switching over the wheel valves leading to the wheels which continue to run stably, the pressure reduction caused by the displacement of the piston 69 will not occur in the brakes of the stably running wheels. According to the so-termed Multiplex method, subsequently, the braking pressure in the other wheel brakes can be set to the desired level by corresponding actuation of the wheel valves 62, 63 and by variation of the pressure with the aid of the piston 69. This way, one single working chamber 67 and the pertinent component parts for the variation of the chamber volume provide for individual modulation of the braking pressure at several wheel brakes.

In order to re-build up the pressure during an anti-lock control phase, the direction of rotation of an output shaft 81 is reversed by change-over of the device 75, in consequence thereof the piston 10 is displaced in the opposite direction and thus the volume of the working chamber 67 is reduced.

A traction slip control action sets in if, for instance, one of the driven wheels shows a tendency to spin when starting to drive on a slippery road surface. As the brake is not applied in this situation, braking pressure can develop only by displacement of the piston 69 to the right, that is in the direction of a reduction of the volume of chamber 67, while a discharge of pressure fluid to the braking pressure generator 59 must be prevented by change-over of the separating valve 61. The wheel valves 62 or 63 assure that the pressure build-up takes effect only in the wheel brake 64' or 65' of the wheel slipping.

As in the embodiment according to FIG. 4, the switch position of the stopping or braking system 75 in the inactive position is chosen to be such that the piston displaces to the left after the motor 72 is switched on and the reversing device 26 must be actuated at the beginning of traction slip control by energization of the magnet coil 77 and thereby the sense of rotation of the output shaft 82 must be reversed.

For the purpose of pressure reduction during a traction slip control period after braking of the imminently locking wheel has been achieved, either the piston 69 can be reset by means of the motor 72 and switching back of the system 75, or braking pressure reduction can be effected by switching back of the separating valve 61 and discharge through this valve to the braking pressure generator 59. An automatic resetting of the piston into its initial position by the force of the spring 80 is also possible. In that case, however, the rotor of the motor 72 would have to be uncoupled from the worm drive 70 by a non-illustrated additional switch position of the system 75. Of course it is also possible to combine these various measures, by providing the information about the piston position obtained with the aid of the travel-measuring device or travel indicator 70 to the controller.

Figure 5:
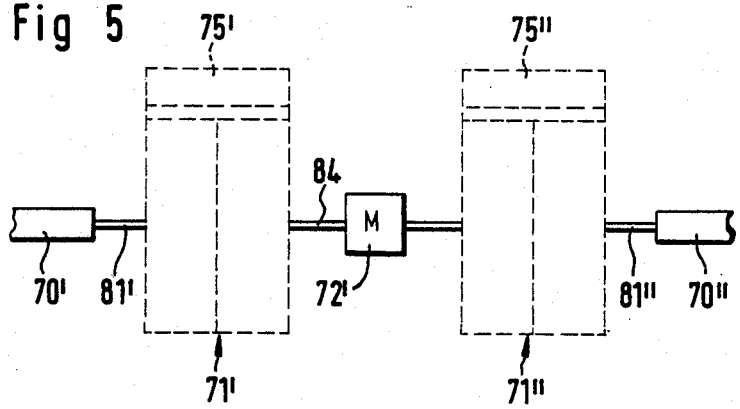
FIG. 5 is a schematic partial view of a variation of the brake system according to FIG. 4 including two planetary gears having each a double unit of planets on the axis of a common electric drive motor.

FIG. 5 shows an embodiment of the invention in which two like gear assemblies 71', 71" of the type illustrated and explained in FIG. 4 are mounted on a rotor shaft 84 of the electric motor 72'. By way of the output shafts 81' and 81", the output torques of the two gear assemblies 71', 71" are transmitted onto the worm drives 70', 70" and from these onto (non-illustrated) pistons and working chambers. The arrangement according to FIG.5 provides for achieving a largely independent braking pressure control in the two circuits of a dual-circuit hydraulic brake system by the use of only one drive motor 72'. Full independence is provided if, for example, a de-coupling between motor 72' and worm drive 70', 70" is adjustable by an additional switch position of the stopping or braking system 75', or 75".

The braking pressure modulator described in the embodiments according to FIGS. 1, 2, 4 and 5 in connection with brake systems with anti-lock control or with anti-lock and traction slip control is substantially composed of the adjusting piston(s) guided in a plunger system, an electric drive motor, a single or double planetary gear and a non self-locking worm drive and is characterized by its simple design and its ease of controllability. A braking pressure modulator according to this invention provides for achieving an anti-lock and-/or traction slip control system with very little manufacturing effort as compared to prior art systems.

What is claimed is:

1. An anti-lock brake system for a vehicle having individual wheel brakes at each of a plurality of wheels, said system comprising pedal operated master cylinder means, a braking pressure modulator hydraulically connected to said master cylinder means by first conduit means and to said individual wheel brakes by second conduit means including individual branch conduits respectively connected to the individual brakes, sensors associated with each of said wheels for generating a first signal upon the sensing of an impending locking of the wheel, control means including a processor for generating a first braking pressure control signal in response to a first signal generated by any one of said sensors, first normally open valve means in said first conduit means and second normally open valve means in each of said individual branch conduits, said first and second valve means each being independently shiftable to a closed position in response to a control signal from said control means, said modulator including spring biased plunger piston means for modulating the pressure applied to said wheel brakes, rotatable drive means including a motor means and normally disengaged clutch means operable when engaged to couple said drive means to said plunger piston means to axially displace said plunger piston means to modulate the pressure applied to any wheel brake in fluid communication with said modulator via its associated second valve means, said clutch means including a normally disengaged first clutch means operable when engaged to couple said drive means to said plunger piston means to displace said plunger piston means in one direction in response to a first signal and second clutch means engageable in response to a second signal to cause said drive means to displace said plunger piston means in opposite direction, said control means being operable in response to a first signal from the sensor at one of said wheels to (1) shift the appropriate first and second valve means to isolate all wheel brakes other than the wheel brake of said one of said wheels from said modulator, (2) isolate said modulator from said master cylinder means, (3) engage said clutch means until the pressure applied to the brake of said one wheel has been changed by an amount predetermined by said processor, and (4) shifting all of the second valve means to maintain the predetermined pressure applied to the last mentioned brake and reconnecting the brakes of the remaining wheels to said modulator to enable said control system to respond to a first signal from a sensor at another of said wheels.

2. The brake system defined in claim 1 wherein said modulator includes means operable upon the disengagement of said clutch means operable to reset said plunger piston means to respective positions established by the pressure in said first conduit means.

3. The brake system defined in claim 1 wherein said sensors are also operable to generate a second signal upon the sensing of an impending slipping of a wheel, said control means being operable to generate a second braking pressure control signal in response to a second signal generated by one of said sensors.

4. The brake system defined in claim 1 wherein said drive means comprises a first sun gear driven in rotation by said motor means, first planet pinions meshed with said first sun gear and mounted on a first planet carrier, a first internal gear meshed with said first pinions and mounted for free rotation, and said clutch means comprises first brake means actuable to frictionally brake said first internal gear to drive said first planet carrier in rotation, and motion transmission means for transforming rotation of said first carrier into axial displacement of said plunger piston means.

5. The brake system defined in claim 4 wherein said motion transmission means comprises a second sun gear fixedly coupled to said first internal gear, second planetary pinions mounted on a second planet carrier fixedly coupled to said first carrier, said second pinions being meshed with said second sun gear, a second internal gear meshed with said second pinions and mounted for free rotation, said clutch means further comprising second brake means actuable to frictionally brake said second internal gear to drive said second carrier in rotation, and said control means includes means for selectively actuating either of said first and second brake means to selectively displace said piston means in either direction.

* * * * *